United States Patent [19]

Seufert

[11] 4,058,297

[45] Nov. 15, 1977

[54] INTERNAL MIXER

[75] Inventor: Wilhelm Seufert, Korntal, Germany

[73] Assignee: Werner & Pfleiderer, Theodorstr, Germany

[21] Appl. No.: 639,888

[22] Filed: Dec. 11, 1975

[30] Foreign Application Priority Data

Dec. 11, 1974 Germany .............................. 2458568

[51] Int. Cl.² .............................................. B29B 1/10
[52] U.S. Cl. ........................................ 366/81; 366/83
[58] Field of Search ....................... 259/6, 21, 41, 104, 259/185, 192, 195, DIG. 2, DIG. 8; 425/201, 209

[56] References Cited

U.S. PATENT DOCUMENTS

| 1,138,410 | 5/1915 | Pointon | 259/DIG. 8 |
| 1,685,637 | 9/1928 | Kempter | 259/DIG. 8 |
| 1,936,248 | 11/1933 | Lasch et al. | 259/195 |

FOREIGN PATENT DOCUMENTS

| 431,012 | 6/1935 | United Kingdom | |
| 741,412 | 12/1955 | United Kingdom | 259/6 |

Primary Examiner—Philip R. Coe
Attorney, Agent, or Firm—Browdy and Neimark

[57] ABSTRACT

An internal mixer for kneading and rolling includes a mixing chamber containing two parallel spaced shafts. Kneading blades and arcuate roller surfaces are provided on the outer peripheries of the shafts. The arcuate surfaces are so disposed on the shafts such that a gap is formed therebetween when in their innermost positions. The arcuate surfaces and kneading blades are disposed serially in the peripheral direction on the shafts. The shafts rotate in opposite directions and so as to provide the same peripheral speed for the arcuate surfaces.

5 Claims, 4 Drawing Figures

INTERNAL MIXER

FIELD OF THE INVENTION

The present invention relates to improvements in an internal mixer for kneading and rolling material, such as rubber, which mixer comprises two mixing shafts which are disposed in a mixing chamber with their axes in spaced parallel relationship, and which are adapted to be driven in opposite directions, the shafts being provided with kneading blades and arcuate roller surfaces on their outer peripheries, wherein the arcuate surfaces of the two mixing shafts rotate in such a manner as to overlap one another and to leave free a roller gap.

BACKGROUND OF THE INVENTION

An internal mixer of the kind described above is known from German Pat. No. 541,788. In this case the mixing shafts are so shaped that, viewed in the longitudinal direction of the mixing shafts, the kneading blades are disposed in the middle of the mixing shafts, and the roller surfaces, which are in the form of narrow cylinders, are disposed in the region of the front ends of the mixing shafts. The mixing shafts rotate with different peripheral speeds of the roller surfaces or of the radially external surfaces of the kneading blades. The kneading blades are disposed at an angle to the longitudinal axis of the mixing shafts with the tip of the angle leading in the direction of rotation. In this way it is intended to ensure that the material being processed will come into the gap between the roller surfaces. On their sides which trails in the direction of rotation the kneading blades have an angular shape with the tip of the angle trailing in the direction of rotation. In this way it is intended to ensure that the material will be removed from the roller surface again and brought into the region of the kneading blades.

In this known internal mixer it has thus already been attempted to combine, on the one hand, the advantages of pure roller mixers, namely uniform and constrained homogenization of the entire mixture in the roller gap, working with a thin layer in the roller gap, and working with a low temperature level, and on the other hand, the advantages of internal mixers working only with kneading blades, that is to say the application of a large amount of energy per unit of time and consequently short mixing times, the simultaneous application of energy to the entire material being mixed, low atmospheric pollution because of the closed construction, a high degree of filing, and ease of operation. This attempt failed because it was not possible to ensure that the entire mixture would be uniformly taken up by the kneading blades and the roller surfaces, because the direction of flow for transferring the material being mixed from the kneading blade to the roller surfaces must be in the direction of the axis, that is to say at right angles to the rotation of the blades.

From German Pat. No. 646,308 (corresponding to British Pat. No. 431,012), an internal mixer is moreover known which has intermeshing kneading rollers and in which mutually offset roller surfaces were disposed on the periphery of each of the mixing shafts, these roller surfaces engaging in one another when the mixing shafts, which rotate in opposite directions and with the same peripheral speed, roll over one another. Through this mutual engagement of the kneading rollers, the roller gap was lengthened and thus the volume of rotating material being mixed was increased. In this known mixer, as also in a rolling mill, temperatures can be effectively controlled. In this known internal mixer, however, the mixing action was found to be unsatisfactory.

The problem sought to be resolved by the present invention is that of improving an internal mixer of the kind first described above, in such a manner that the exchange of material being mixed between the kneading blades and the roller gap is effected between the roller surfaces by constraint and completely uniformly for the entire material being mixed.

SUMMARY OF THE INVENTION

According to the present invention, there is provided an internal mixer for kneading and rolling, including a mixing chamber containing two mixing shafts adapted to be driven in opposite directions. The axes of the shafts are in a spaced parallel relationship. Kneading blades and arcuate roller surfaces are provided on the outer peripheries of the shafts, the two mixing shafts being positioned relative to each other so that the arcuate surfaces are aligned with one another when in their innermost position leaving a gap therebetween. The arcuate surfaces and the kneading blades are disposed serially in the peripheral direction, the mixing shafts being adapted to be driven to provide the same peripheral speed for the arcuate surfaces.

By this means, the particles of material being mixed are obligatorily and always alternately subjected to the squeezing effect in the roller gap and to the kneading effect on the kneading blades, this being effected in a fixed time-ratio dependent on the peripheral length of the roller surfaces and on the number and shape of the kneading blades. The exchange of material between the roller surfaces and the kneading blades therefore takes place in the peripheral direction, that is to say in the main direction of flow of the material being mixed. Through the measures according to the present invention, the effect is achieved that the previously described advantages of pure rolling mills and those of internal mixers working only with kneading blades are combined in an optimum manner. It has been found particularly advantageous for the roller surfaces to extend over from approximately ¼ to ⅓, that is to say from 90° – 120°, of the periphery of the mixing shaft in question.

BRIEF DESCRIPTION OF THE DRAWINGS

Further advantages and features of the present invention will be seen from the description of one example of an embodiment and with reference to the drawing, in which.

DETAILED DESCRIPTION OF THE PREFERRED EMBODIMENTS

Figure 1:
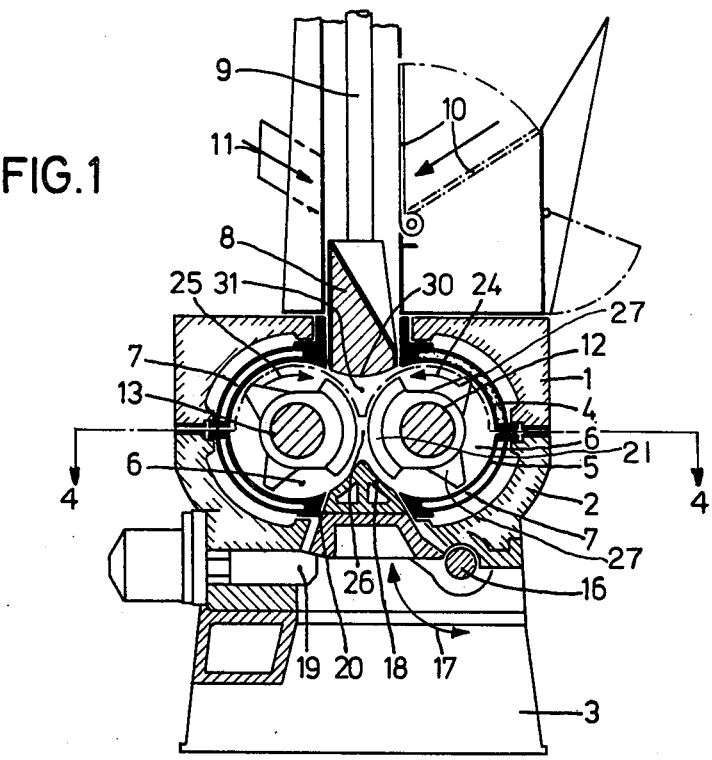
FIG. 1 is a part sectional elevation of an internal mixer according to the present invention, with mixing shafts exposed at the front end.

The internal mixer shown in FIGS. 1–4 comprises an upper casing part 1 and a lower casing part 2 resting on a machine base 3. The casing 1,2 contains a mixing chamber 6 bounded by an upper part 4 and a lower part 5. Between upper part 4 of the mixing chamber and the upper part 1 of the casing, and similarly between the lower part 5 of the mixing chamber and the lower part 2 of the casing, cooling ducts 7 are provided. The material to be mixed is fed from above under pressure to the mixing chamber 6 by means of a ram 8, which is adapted to be operated by means of a hydraulic power cylinder (not shown) with the aid of a piston rod 9. When the ram is raised the material to be mixed, for example raw rubber or PVC, is introduced through a filler flap 10 which for this purpose is swung into an open position, shown in dash-dot lines. Through another filler opening 11 components (in powder form) which are to be worked into the main material are introduced.

Figure 2:
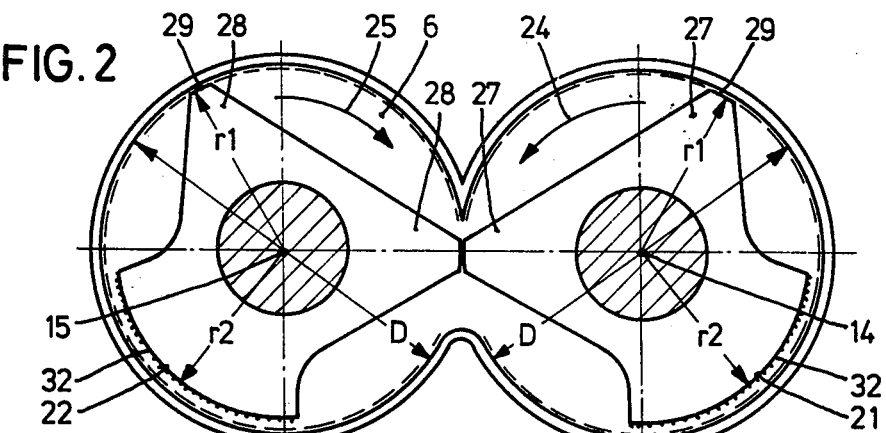
FIG. 2 is a front view of two mixing shafts on a larger scale.

As can be seen also in FIG. 2, two mixing shafts 12, 13 are disposed in the mixing chamber 6 in such a manner that their axes 14, 15 extend horizontally and parallel to one another. The mixing chamber walls have the shape of two cylinders penetrating one another in the central vertical plane, that is to say, the distance between the two axes 14, 15 is somewhat smaller than the diameter D or the cylindrical portions of the mixing chamber 6 (in this regard, see in particular FIG. 2).

The bottom saddle of the mixing chamber 6 is in the form of a pivoting saddle 18 which is adapted to pivot away downwardly in the direction of the arrow 17 about a pin 16. The saddle 18 is held in the operative position, in which it has been swung upwards, by means of a hydraulically operated locking device 19. The bottom opening 20, which is closed by the pivoting saddle 18 in operative position shown in FIG. 1, serves to empty the mixing chamber after the mixing, kneading, and rolling operation.

Figure 3:
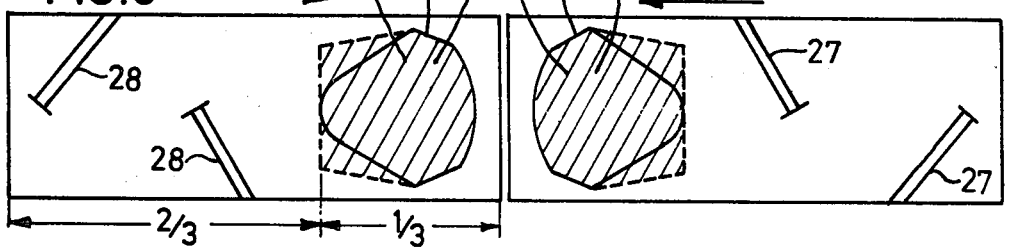
FIG. 3 is a development of the mixing shafts, in plan view.

On their outer peripheries, the mixing shafts 12, 13 are provided with arcuate roller surfaces 21 and 22 respectively, which project from the main body of the mixing shafts 12 and 13, respectively. The arcuate surfaces 21, 22 are therefore annular cylinder segments which, as can be seen in FIG. 3, are of identical configuration in their bounding edges 23—viewing in the direction of rotation 24 or 25 in each case. The shafts are positioned so that their respective arcuate surfaces, in operation, reach their innermost position (i.e. their closest position to the axis of the other shaft) simultaneously. Since their profile is identical, the arcuate surfaces are completely aligned with one another in their innermost positions and a roller gap 26 is formed therebetween. The surfaces 21 and 22 extend over about one-third of the periphery of the mixing shafts 12 and 13, respectively (see FIG. 3). On the remainder of the peripheral region of the mixing shafts 12 and 13, winglike kneading blades 27 and 28, respectively, are disposed, these blades extending at an angle to the direction of rotation 24 or 25. The kneading blades 27 and 28 are in the form of so-called tangent kneading blades, that is to say, twice the radius $r_1$ (see FIG. 2) of the kneading blades 27 or 28 is approximately equal to the distance between the two axes 14 and 15 of the mixing shafts 12, 13, from which it follows once again that $2r_1 < D$. Between the kneading blades 27 and 28, respectively, and the inner wall of the mixing chamber 6, a kneading zone 29, which is shown in dashed lines in FIG. 2, is provided.

The radius $r_2$ of the arcuate surfaces 21 or 22 is smaller than the radius $r_1$ of the kneading blades 27 or 28, which is a prerequisite if a gap 26 is to be formed at all. Corresponding parts of the elements carried by the two mixing mechanism shafts rotate with the same peripheral speed, that is to say, at the same rotational speed but in opposite directions, because the points corresponding to one another in each case are disposed at the same radial distance from the axes 14 and 15, respectively.

The ram 8 is slightly curved in the downward direction on its lower side 30, that is to say, it does not completely fill the free wedge-shaped space as far as the gap 26, so that a storage space 31 is formed there, from which the material being mixed is drawn in and discharged again by the kneading blades 27, 28 and the surfaces 21, respectively, so that a continuous exchange of the material being mixed takes place in this admission zone.

As illustrated in FIG. 3, the arcuate surfaces 21, 22 may be provided with fluting 32. As can further be seen from FIG. 3, the surfaces 21, 22 do not extend over the full axial length of the mixing shafts 12, 13, in order that the already very high loading of the mixing chamber side surfaces, in particular of the mixing shaft outlets and seals, will not be further increased. The edge lying at the front in the direction of rotation 24 or 25 should extend predominantly in the longitudinal direction of the mixing shafts, so that the material being mixed is drawn into the gap 26 as effectively as possible over the entire length of the surfaces 21, 22, and is not simply displaced axially as by a plough share.

Figure 4:
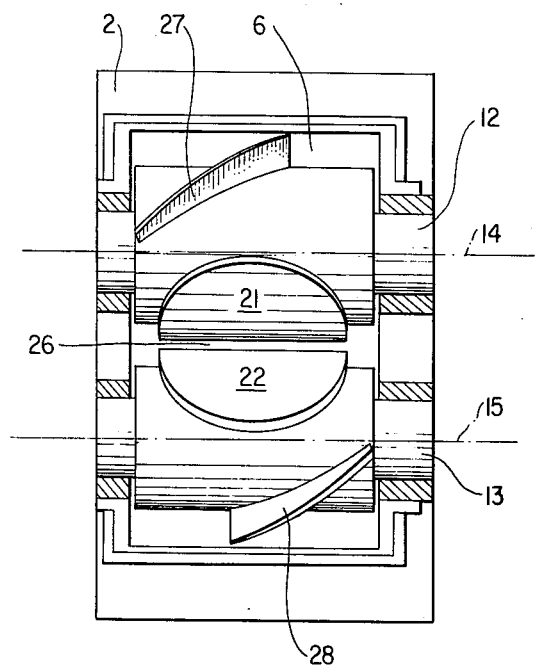
FIG. 4 is a part sectional, plan view of the underside of the housing of the internal mixer illustrated in FIG. 1, showing the mixing shafts and other members in place.

Referring to FIG. 4 and FIG. 1, the respective mixing shafts 12 and 13 are supported in a conventional manner within the internal mixture housing, for example by respective pairs of bearings (not shown). Conventional thrust bearings may be provided for taking up the respective forces acting on the respective mixing shafts 12 and 13.

The mixing chamber 6 may be sealed from the mixing shafts 12 and 13 by conventional slip ring seals (not illustrated) between the housing and each of the mixing shafts 12 and 12 on both sides of the mixing chamber 6.

It will be obvious to those skilled in the art that various changes may be made without departing from the scope of the invention and the invention is not to be considered limited to what is shown in the drawings and described in the specification.

What is claimed is:

1. An internal mixer for kneading and rolling comprising:
   a mixing chamber;
   two mixing shafts, each having an axis and an outer periphery, within said mixing chamber, said axes of said shafts being in spaced parallel relationship;
   kneading blades provided on said outer peripheries of said shafts; and
   arcuate roller surfaces connected to said outer peripheries of said shafts; and wherein
   said shafts are positioned in parallel with respect to one another such that when said shafts are rotated in superposed relation a gap always exists therebetween;
   said arcuate surfaces and said kneading blades are arranged on each of said mixing shafts in succession in the circumferential direction; and
   said mixing shafts are drivable in opposite directions to impart identical peripheral speeds to said arcuate surfaces.

2. An internal mixer in accordance with claim 1, wherein said arcuate roller surfaces extend over from approximately one quarter to approximately one-third of the periphery of their respective said mixing shafts.

3. An internal mixer in accordance with claim 1, wherein said kneading blades have a given radius approximately equal to one-half the distance between said axes of said shafts.

4. An internal mixer in accordance with claim 3, wherein said roller surfaces have a given radius, said radius of said arcuate roller surfaces being less than said radius of said kneading blades.

5. An internal mixer in accordance with claim 1, wherein said kneading blades extend at an angle, other than a right angle, to the direction of rotation of said shafts.

* * * * *